(12) United States Patent
Sakagami et al.

(10) Patent No.: US 11,495,857 B2
(45) Date of Patent: Nov. 8, 2022

(54) BATTERY AND METHODS FOR CONNECTING/DISCONNECTING CONDUCTIVE WIRE TO/FROM BATTERY

(71) Applicant: Mazda Motor Corporation, Hiroshima (JP)

(72) Inventors: Sho Sakagami, Hiroshima (JP); Taisuke Hazama, Hiroshima (JP); Katsumasa Yoshida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 397 days.

(21) Appl. No.: 16/681,844

(22) Filed: Nov. 13, 2019

(65) Prior Publication Data
US 2020/0168866 A1 May 28, 2020

(51) Int. Cl.
| | |
|---|---|
| *H01M 50/10* | (2021.01) |
| *H01M 50/20* | (2021.01) |
| *H01R 9/22* | (2006.01) |
| *H01R 11/12* | (2006.01) |
| *H01M 50/543* | (2021.01) |
| *H01M 50/572* | (2021.01) |

(52) U.S. Cl.
CPC ......... *H01M 50/20* (2021.01); *H01M 50/543* (2021.01); *H01R 9/223* (2013.01); *H01R 11/12* (2013.01); *H01M 50/572* (2021.01); *H01M 2220/20* (2013.01); *Y02E 60/10* (2013.01)

(58) Field of Classification Search
CPC ........... H01M 50/572; H01M 2220/20; H01M 50/20; H01M 50/543; Y02E 60/10; H01R 9/223; H01R 11/12

USPC .......................................................... 429/96
See application file for complete search history.

(56) References Cited

U.S. PATENT DOCUMENTS

| | | | | |
|---|---|---|---|---|
| 5,576,516 A | * | 11/1996 | Kameyama | .......... H01R 11/284 439/522 |
| 2009/0317695 A1 | * | 12/2009 | Wood | ................ H01M 10/6563 429/90 |
| 2011/0155485 A1 | * | 6/2011 | Tsurumi | ................ H01M 10/48 429/7 |
| 2017/0288286 A1 | * | 10/2017 | Buckhout | ........... H01M 10/613 |

FOREIGN PATENT DOCUMENTS

JP 2003-157828 A 5/2003

* cited by examiner

*Primary Examiner* — Cynthia H Kelly
*Assistant Examiner* — Omar M Kekia
(74) *Attorney, Agent, or Firm* — Xsensus LLP

(57) ABSTRACT

A battery mounted on a vehicle, the battery including a battery case having an electrically conductive material and configured to be attached to a body of the vehicle so as to electrically connect to the body of the vehicle. The battery case includes a plus terminal to which an electrical conductor is connected to supply electric power to electrical equipment on-board the vehicle, a minus terminal, a ground member that is attached to the minus terminal so as to electrically connect the minus terminal and the battery case, and a plus terminal cover that covers the plus terminal. In a state where the ground member is attached to the minus terminal, the ground member abuts the plus terminal cover so as to restrict a movement of the plus terminal cover from exposing the plus terminal.

15 Claims, 9 Drawing Sheets

BATTERY AND METHODS FOR CONNECTING/DISCONNECTING CONDUCTIVE WIRE TO/FROM BATTERY

CROSS-REFERENCE TO RELATED APPLICATION

The present application claims priority to JP 2018-219039, filed Nov. 22, 2018, the entire contents of which are incorporated herein by reference.

Technical Field

The present disclosure relates to a battery and, in particular, to a battery that is mounted on a vehicle for use and methods for connecting/disconnecting a conductive wire to/from a battery.

Background Art

A terminal short-circuit prevention device for an on-board battery is disclosed in JP-A-2003-157828 (Patent document 1). In this terminal short-circuit prevention device, a short-circuit prevention section that inhibits simultaneous contact of a tool with a positive terminal and a negative terminal of the battery is interposed between both of the terminals, so as to prevent occurrence of a short circuit between the terminals of the battery. In the same document, such a structure is also disclosed that a terminal protection section for covering the positive terminal and the negative terminal is provided and this terminal protection section is configured to be able to be alternatively opened, so as to prevent the short circuit between the terminals of the battery.

Meanwhile, in general, a minus terminal (the negative terminal) of the on-board battery is electrically connected to a vehicle body of a vehicle by a harness, and the minus terminal is grounded to have an earth potential.

PRIOR ART DOCUMENTS

Patent Documents

[Patent document 1] JP-A-2003-157828

SUMMARY

Problems to be Solved

However, when the minus terminal of the battery is connected to the vehicle body by the harness, there is a case where connection of the harness is forgotten or the connected harness is accidentally disconnected. As a result, the minus terminal is no longer grounded and deviates from earth potential, which possibly leads to various types of failures of on-board electrical equipment. In addition, in the case where the minus terminal of the battery is connected to the vehicle body by the harness, such problems arise that the number of the harnesses to be connected is increased and cost is thus increased.

In order to solve these problems, it is considered to connect the minus terminal of the battery to a battery case that is formed of an electric conductor such as metal and to electrically connect the battery case to the vehicle body by using a bracket or the like of the electric conductor used to attach this battery case to the vehicle body. Just as described, when the minus terminal of the battery is electrically connected to the vehicle body via the battery case, the harness used to connect the minus terminal to the vehicle body is no longer necessary. As a result, it is possible to avoid such a situation where the connection of the harness is forgotten and the failure caused by the accidental disconnection of the harness.

However, even in the case where a mechanism that prevents the short circuit between a plus terminal (the positive terminal) and the minus terminal is provided as in Patent document 1, a new problem arises that, when the minus terminal of the battery is electrically connected to the vehicle body via the battery case, a short circuit may easily occur between the plus terminal and the battery case.

Therefore, the present disclosure provides a battery capable of preventing an occurrence of a short circuit between a plus terminal and a minus terminal while using an electrically conductive battery case for connecting the minus terminal to a vehicle body and providing methods for connecting/disconnecting a conductive wire to/from a battery.

Alternatives for Solving the Problem

In one approach to solving the above-described problems, a battery mounted on a vehicle for use and includes: a battery case that is formed of an electric conductor and is attached to a vehicle body of the vehicle; a plus terminal that is provided in this battery case and to which a conductive wire for supplying electric power to on-board electrical equipment is connected; a minus terminal that is provided in the battery case; a ground member that is attached to the minus terminal so as to electrically connect the minus terminal and the battery case; and a plus terminal cover that covers the plus terminal. In a state where the ground member is attached to the minus terminal, the ground member abuts the plus terminal cover, and thus exposure of the plus terminal is restricted by the plus terminal cover.

According to the present embodiment that is configured as above, the minus terminal and the battery case are electrically connected to each other by the ground member, and the minus terminal is electrically connected to the vehicle body of the vehicle via the battery case. Thus, the minus terminal can be connected to the vehicle body without using a special harness. In this way, it is possible to reduce cost of the harness and to prevent a case where connection of the harness to the vehicle body is forgotten and accidental disconnection thereof. In addition, in the state where the minus terminal is connected to the battery case, the ground member abuts the plus terminal cover. In this way, the exposure of the plus terminal is restricted by the plus terminal cover. Thus, it is possible to prevent a short circuit between the plus terminal and the minus terminal via the battery case.

The present embodiment further includes: a minus terminal cover that covers the minus terminal. In a state where the minus terminal cover covers the minus terminal, the minus terminal cover abuts the plus terminal cover, and thus the exposure of the plus terminal is restricted by the plus terminal cover.

According to the present embodiment that is configured as above, in the state where the minus terminal cover covers the minus terminal, the plus terminal cover is restricted to prevent the exposure of the plus terminal. Thus, it is possible to further reliably prevent the exposure of the plus terminal in the state where the minus terminal is connected to the battery case.

In the present embodiment, the battery case is electrically connected to the vehicle body of the vehicle via a conductive battery bracket used to fix the battery case to the vehicle body of the vehicle.

According to the present embodiment that is configured as above, the battery case is connected to the vehicle body via the conductive battery bracket used to fix the battery case to the vehicle body. Thus, the battery case can be connected to the vehicle body without providing a special member that electrically connects the battery case and the vehicle body. In addition, it is possible to reliably prevent a case where the connection of the battery case to the vehicle body is forgotten.

In the present embodiment, two or more of the battery brackets are aligned in a longitudinal direction of the vehicle. According to the present embodiment that is configured as above, two or more of the battery brackets are aligned in the longitudinal direction of the vehicle. Thus, even in the case of contact failure between any of the battery brackets and the battery case or between any of the battery brackets and the vehicle body, the battery case can reliably and electrically be connected to the vehicle body.

The present embodiment is a method for connecting a conductive wire to a plus terminal of the battery according to the present embodiment, and includes: a step of connecting the conductive wire to the plus terminal; a step of covering the plus terminal, to which the conductive wire is connected, with a plus terminal cover; and a step of attaching a ground member to a minus terminal of the battery, electrically connecting the minus terminal and a battery case of the battery, and restricting exposure of the plus terminal.

According to the present embodiment that is configured as above, when the ground member is attached to the minus terminal of the battery, exposure of the plus terminal is restricted. Thus, in work of connecting the conductive wire to the plus terminal, it is possible to prevent the minus terminal and the battery case from being connected to each other by the ground member while the plus terminal is exposed. In this way, in the work of connecting the conductive wire to the plus terminal of the battery, it is possible to prevent a short circuit between the plus terminal and the minus terminal.

The present embodiment is a method for disconnecting a conductive wire from a plus terminal of the battery according to the present embodiment, and includes: a step of detaching a ground member from a minus terminal of the battery, so as to cancel connection between a battery case of the battery and the minus terminal and to allow exposure of the plus terminal; a step of operating a plus terminal cover of the battery to expose the plus terminal; and a step of disconnecting the conductive wire from the plus terminal.

According to the present embodiment that is configured as above, when the ground member is detached from the minus terminal of the battery, the plus terminal can be exposed. Thus, it is possible to prevent the exposure of the plus terminal while the minus terminal and the battery case remain to be connected to each other. In this way, in work of disconnecting the conductive wire from the plus terminal of the battery, it is possible to prevent a short circuit between the plus terminal and the minus terminal.

Advantage of the Disclosure

According to the battery of the present disclosure, it is possible to prevent the occurrence of the short circuit between plus terminal and the minus terminal while using the battery case as the electric conductor that connects the minus terminal to the vehicle body.

MODES FOR CARRYING OUT THE EMBODIMENTS

Figure 1:
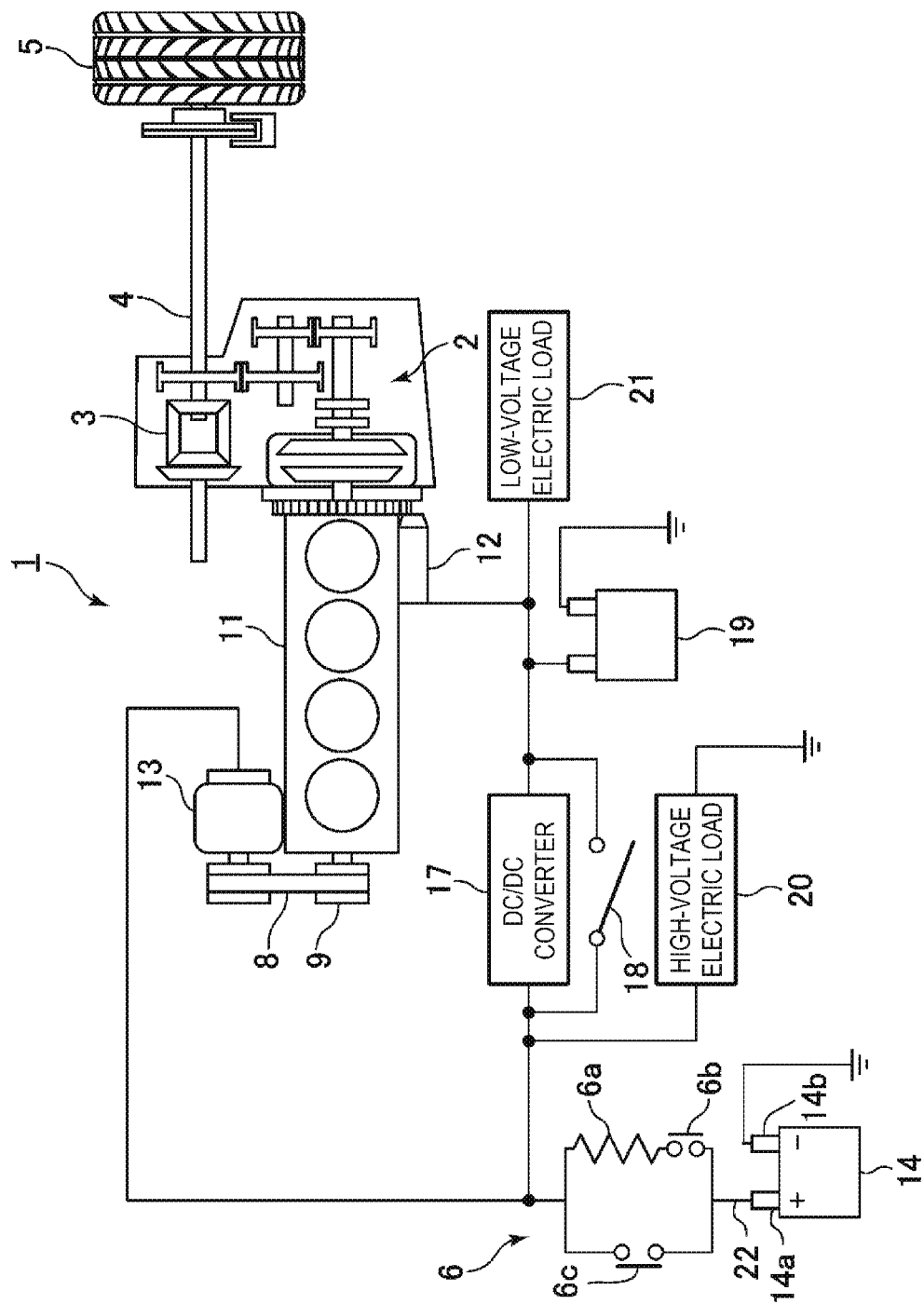
FIG. 1 is a block diagram for schematically illustrating an overall configuration of a vehicle on which a battery according to an embodiment of the present embodiment is mounted.
Figure 2:
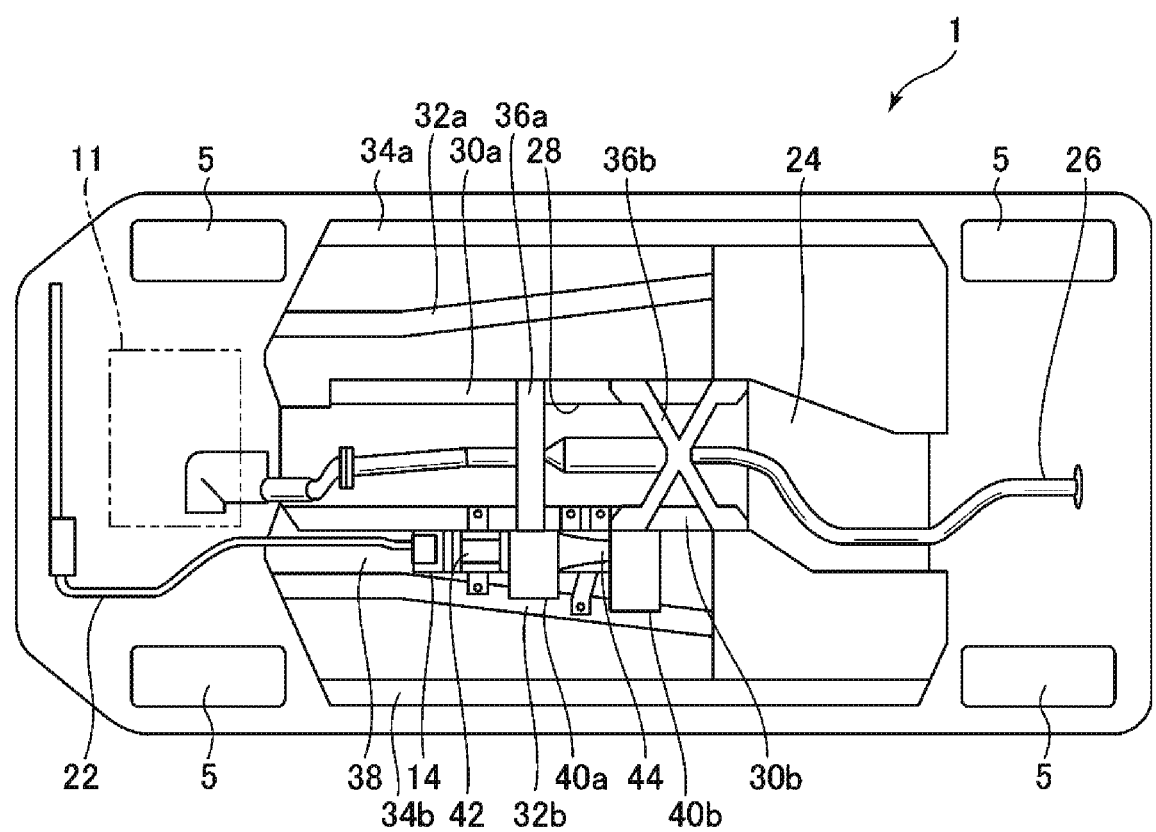
FIG. 2 is a bottom view of the vehicle on which the battery according to the embodiment of the present embodiment is mounted.

Next, a description will be made on an embodiment of the present disclosure with reference to the accompanying drawings. FIG. 1 is a block diagram for schematically illustrating an overall configuration of a vehicle on which a battery according to the embodiment of the present disclosure is mounted. FIG. 2 is a bottom view of the vehicle on which the battery according to the embodiment of the present disclosure is mounted.

As illustrated in FIG. 1, a vehicle 1 primarily has an engine 11, a gear-driven starter 12, an integrated starter generator (ISG) 13, a lithium-ion battery 14 as the battery, a DC/DC converter 17, a lead storage battery 19, a high-voltage electric load 20, and a low-voltage electric load 21.

The engine 11 is an internal combustion engine (a gasoline engine or a diesel engine) for generating drive power of the vehicle 1. The drive power of the engine 11 is transmitted to wheels 5 via an output shaft 9, a transmission 2, a decelerator 3, and a driveshaft 4. The output shaft 9 of the engine 11 is coupled to the gear-driven starter 12 via a gear. When a user turns on an ignition switch (not illustrated), the gear-driven starter 12 uses electric power supplied from the lead storage battery 19 to start the engine 11.

The ISG 13 is a motor generator that has: an electric power generating function of generating the electric power when being driven by the engine 11; and a motor function of generating the drive power of the vehicle 1. The ISG 13 is coupled to the output shaft 9 of the engine 11 via a belt 8. In addition, the ISG 13 is electrically connected to the lithium-ion battery 14 via a relay circuit 6 that includes a resistor 6a and switching elements 6b, 6c. This relay circuit 6 is also connected to the DC/DC converter 17. When the ISG 13 and the DC/DC converter 17 are connected to the lithium-ion battery 14 first, the switching element 6b on a side where the resistor 6a is provided is turned on, so as to prevent damage to an electronic component and the like caused by a rush current. Thereafter, while the switching element 6b is turned off, the switching element 6c is turned on, so as to maintain connection between the lithium-ion battery 14 and each of the ISG 13 and the DC/DC converter 17. Basically, when the ignition switch (not illustrated) is turned on, the ISG 13 and the DC/DC converter 17 are connected to the lithium-ion battery 14. When the ignition switch is turned off, the connection between the lithium-ion battery 14 and each of the ISG 13 and the DC/DC converter 17 is canceled (blocked).

The lithium-ion battery 14 includes plural lithium-ion battery cells that are connected in series. The lead storage battery 19 includes plural lead storage battery cells that are connected in series. For example, a nominal voltage of the lithium-ion battery 14 is DC 24 V, and a nominal voltage of the lead storage battery 19 is DC 12 V. A plus terminal 14a of the lithium-ion battery 14 is connected to the relay circuit 6 by a wire harness 22 as a conductive wire. Meanwhile, a minus terminal 14b of the lithium-ion battery 14 has to be electrically connected to minus-side terminals of the high-voltage electric load 20 and the low-voltage electric load 21, and thus is electrically connected to a vehicle body of the vehicle 1.

As illustrated in FIG. 2, the lithium-ion battery 14 is attached to a lower side of a floor panel 24 on a bottom surface of the vehicle 1. Note that FIG. 2 illustrates a state where an undercover (not illustrated) that is attached to the bottom surface of the vehicle 1 is detached. In addition, in this embodiment, the engine 11 is disposed in a front portion of the vehicle 1, and, at a center of a bottom portion of the vehicle 1, an exhaust pipe 26 extending from this engine 11 extends to the rear of the vehicle 1. The exhaust pipe 26 is accommodated in a tunnel section 28 that is formed at a center in a vehicle width direction of the floor panel 24 to extend in a longitudinal direction of the vehicle 1.

In addition, on both sides of the tunnel section 28, tunnel side frames 30a, 30b are disposed in a manner to extend in the longitudinal direction of the vehicle 1. Furthermore, on both outer sides of the tunnel side frames 30a, 30b, floor frames 32a, 32b that are disposed substantially in a chevron shape are provided in a manner to extend in the longitudinal direction of the vehicle 1. Moreover, side sills 34a, 34b are provided along both sides of the vehicle 1. These tunnel side frames 30a, 30b, floor frames 32a, 32b, and side sills 34a, 34b are fixed to the lower side of the floor panel 24, reinforce the floor panel 24, and increase rigidity of the entire vehicle 1.

At positions between the two tunnel side frames 30a, 30b, a first tunnel cross member 36a and a second tunnel cross member 36b, each of which extends in the vehicle width direction, are attached in a manner to cross the tunnel section 28. The first tunnel cross member 36a is a slender plate member, the second tunnel cross member 36b is an X-shaped plate member, and the first tunnel cross member 36a and the second tunnel cross member 36b support the exhaust pipe 26, which is accommodated in the tunnel section 28, and the like from the lower side. Since the first tunnel cross member 36a and the second tunnel cross member 36b are attached in the manner to cross the tunnel section 28, deformation of the tunnel section 28 during a side collision of the vehicle 1 is suppressed.

In an elongated recessed section 38 that is located between the tunnel side frame 30b and the floor frame 32b and extends in the longitudinal direction of the vehicle 1, the elongated rectangular-parallelepiped lithium-ion battery 14 is accommodated. A first recessed section cross member 40a and a second recessed section cross member 40b as cross members are attached to the tunnel side frame 30b and the floor frame 32b in a manner to cross this elongated recessed section 38. Each of these first recessed section cross member 40a and second recessed section cross member 40b is a rectangular plate member and suppresses deformation of the recessed section 38 during the side collision of the vehicle 1.

Furthermore, a fixing bracket that fixes the lithium-ion battery 14 to the floor panel 24 is attached to the tunnel side frame 30b and the floor frame 32b in a manner to cross the recessed section 38. This fixing bracket is constructed of a first fixing bracket 42 and a second fixing bracket 44, is fixed to a bottom surface of the lithium-ion battery 14 by bolts, and thereby fixes the lithium-ion battery 14 to the floor panel 24.

The first fixing bracket 42 is disposed on a front side of the first recessed section cross member 40a in the longitudinal direction of the vehicle 1, and the second fixing bracket 44 is disposed between the first recessed section cross member 40a and the second recessed section cross member 40b in the longitudinal direction of the vehicle 1. Accordingly, these members are disposed in an order of the first fixing bracket 42, the first recessed section cross member 40a, the second fixing bracket 44, and the second recessed section cross member 40b in the longitudinal direction from a front side of the vehicle 1.

Figure 3:
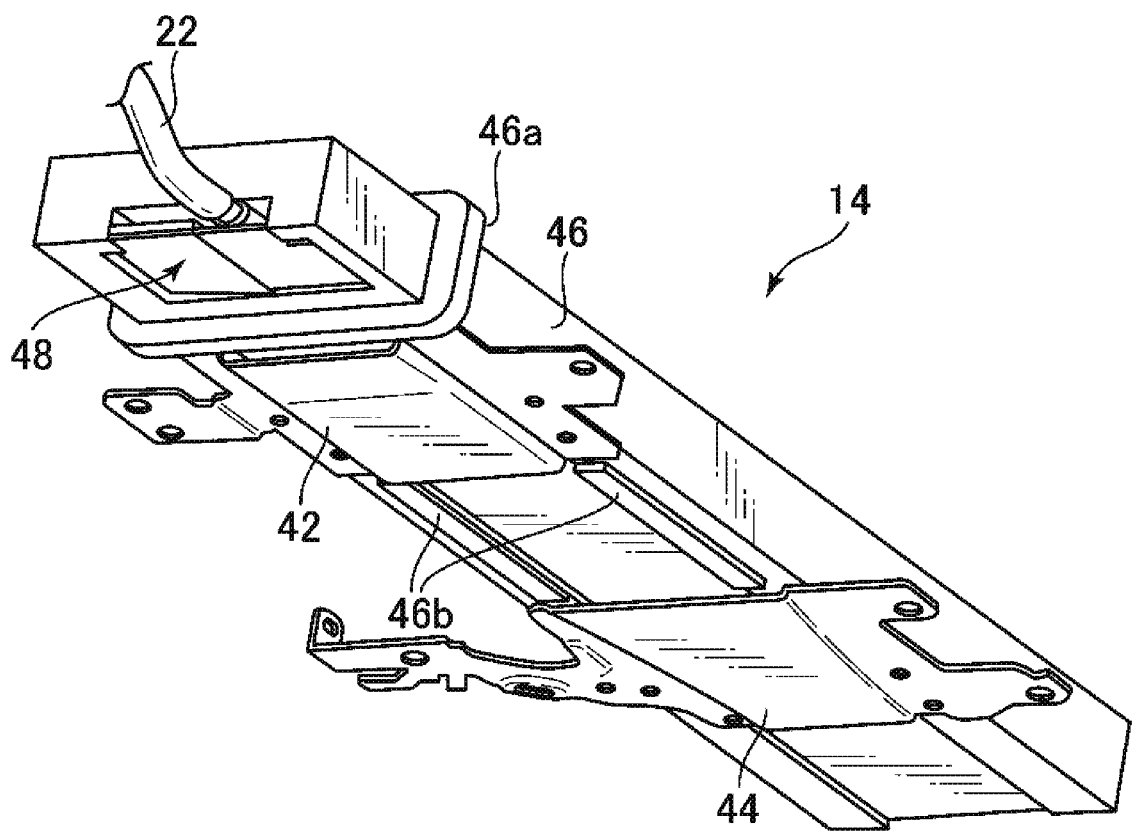
FIG. 3 is a perspective view of a state where the battery according to the embodiment of the present embodiment is detached from a vehicle body.

Next, a description will be made on a structure of the lithium-ion battery 14 as the battery according to the embodiment of the present disclosure with reference to FIG. 3 to FIG. 7. FIG. 3 is a perspective view of a state where the battery according to the embodiment of the present disclosure is detached from the vehicle body. FIG. 4 to FIG. 7 are views for illustrating a procedure of connecting the wire harness 22 as the conductive wire to the battery according to the embodiment of the present disclosure.

As illustrated in FIG. 3, the lithium-ion battery 14 as the battery according to the embodiment of the present disclosure has a battery case 46 that is an electric conductor and is made of metal. This battery case 46 is an elongated rectangular-parallelepiped case and accommodates the plural lithium-ion battery cells (not illustrated). In addition, a wire connection section 48 is provided on a bottom surface at a front end of the battery case 46 in the vehicle 1, and the wire harness 22 is connected to the wire connection section 48. The battery case 46 is supported by the first fixing bracket 42 and the second fixing bracket 44 as the battery brackets from below, and is attached to the vehicle body of the vehicle 1. These first fixing bracket 42 and second fixing bracket 44 are conductive members. The battery case 46 is electrically connected to the vehicle body of the vehicle 1 via the first and second fixing brackets.

Furthermore, a first seal member 46a is attached to a portion of the battery case 46 between the wire connection section 48 and the first fixing bracket 42. This first seal member 46a prevents entry of water and the like into the wire connection section 48. Moreover, two second seal members 46b are attached to a portion of the bottom surface of the battery case 46 between the first fixing bracket 42 and the second fixing bracket 44, and seals a clearance between cross members (not illustrated) of the vehicle 1.

Next, a description will be made on a configuration of the wire connection section 48 that is provided at an end of the battery case 46 with reference to FIG. 4 to FIG. 7. As illustrated in FIG. 4 to FIG. 7, the wire connection section 48 of the battery case 46 is provided with: a terminal board 50; the plus terminal 14a, to which the wire harness 22 is connected; the minus terminal 14b; a ground plate 52 (FIG. 6) as a ground member; a plus terminal cover 54a that covers the plus terminal 14a; and a minus terminal cover 54b that covers the minus terminal 14b. The plus terminal cover 54a and minus terminal cover 54b are made of non-conductive materials.

Figure 4:
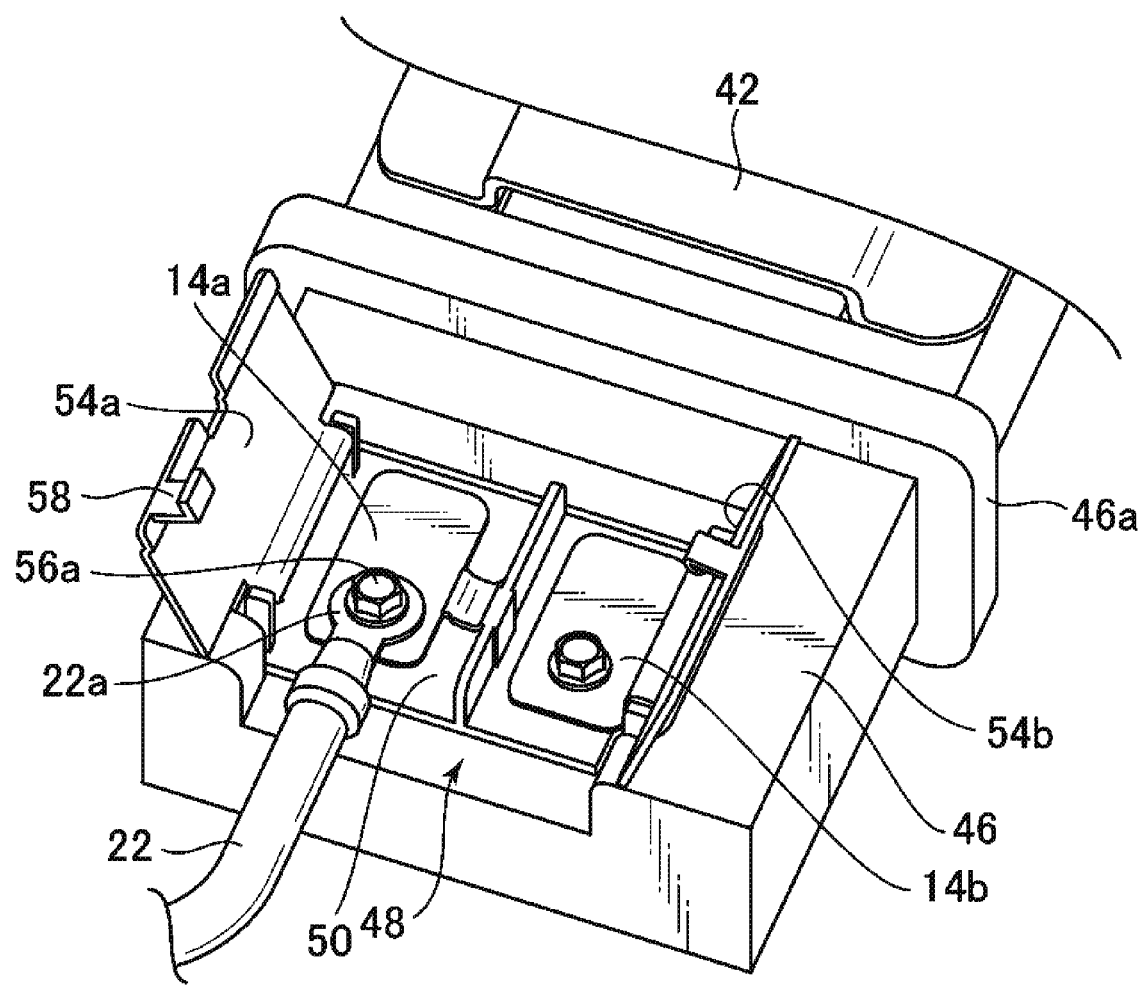
FIG. 4 is a view for illustrating a procedure of connecting a wire harness to the battery according to the embodiment of the present embodiment.
Figure 7:
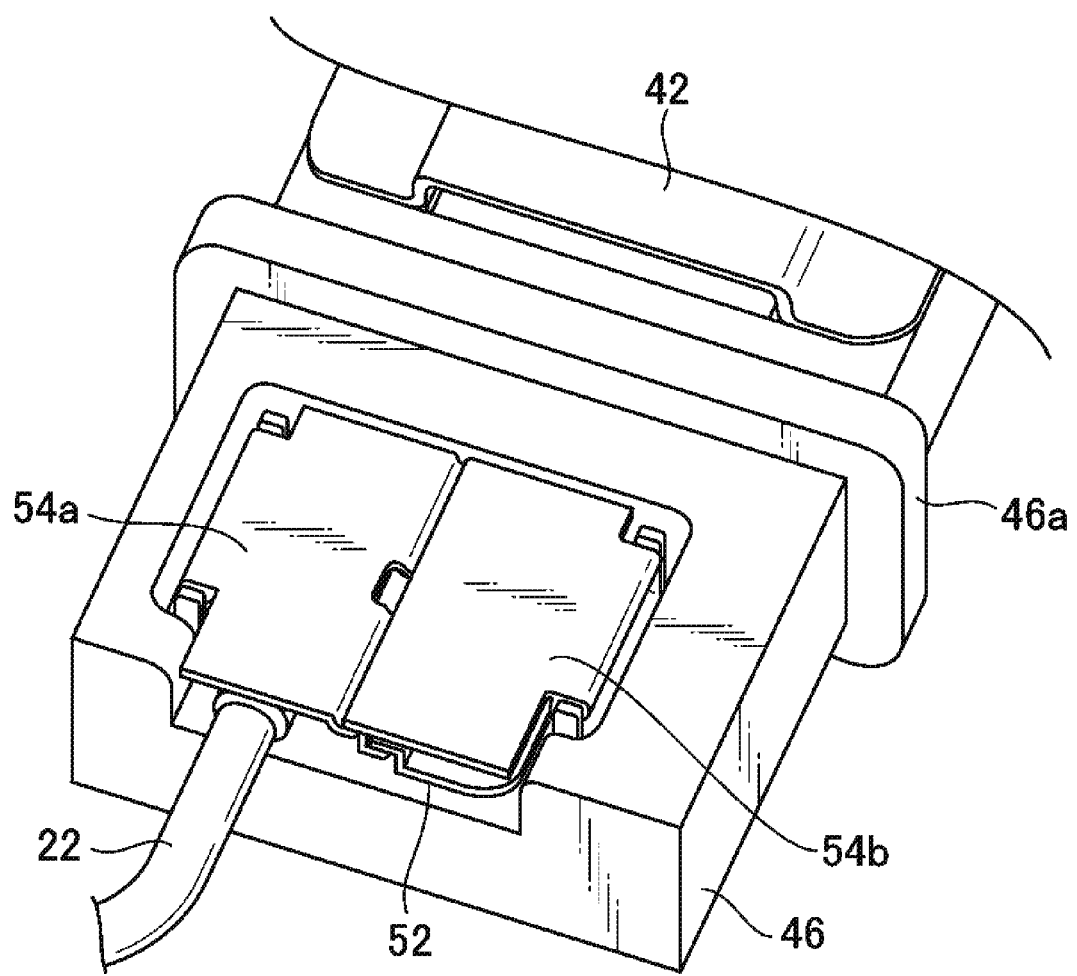
FIG. 7 is a view for illustrating the procedure of connecting the wire harness to the battery according to the embodiment of the present embodiment.

The terminal board 50 is a board that is attached to an end of the elongated battery case 46 and is formed of an electrically insulating material. The plus terminal 14a and the minus terminal 14b are attached to the terminal board 50 in a manner to align hereon. As illustrated in FIG. 4, the terminal board 50 is attached to a recessed section that is formed at the one end of the battery case 46. As illustrated in FIG. 7, in a state where the terminal board 50 is covered with the plus terminal cover 54a and the minus terminal cover 54b, bottom surfaces of each of the covers and the battery case 46 are substantially flush.

The plus terminal 14a and the minus terminal 14b are metallic terminals that have a rectangular shape and respectively constitute a positive electrode and a negative electrode of the lithium-ion battery 14, and are formed with female screws such that a connection terminal 22a of the wire harness 22 and the ground plate 52 can respectively be screwed. As illustrated in FIG. 4, in this embodiment, the connection terminal 22a of the wire harness 22 is fixed to the plus terminal 14a by a screw 56a.

Figure 6:
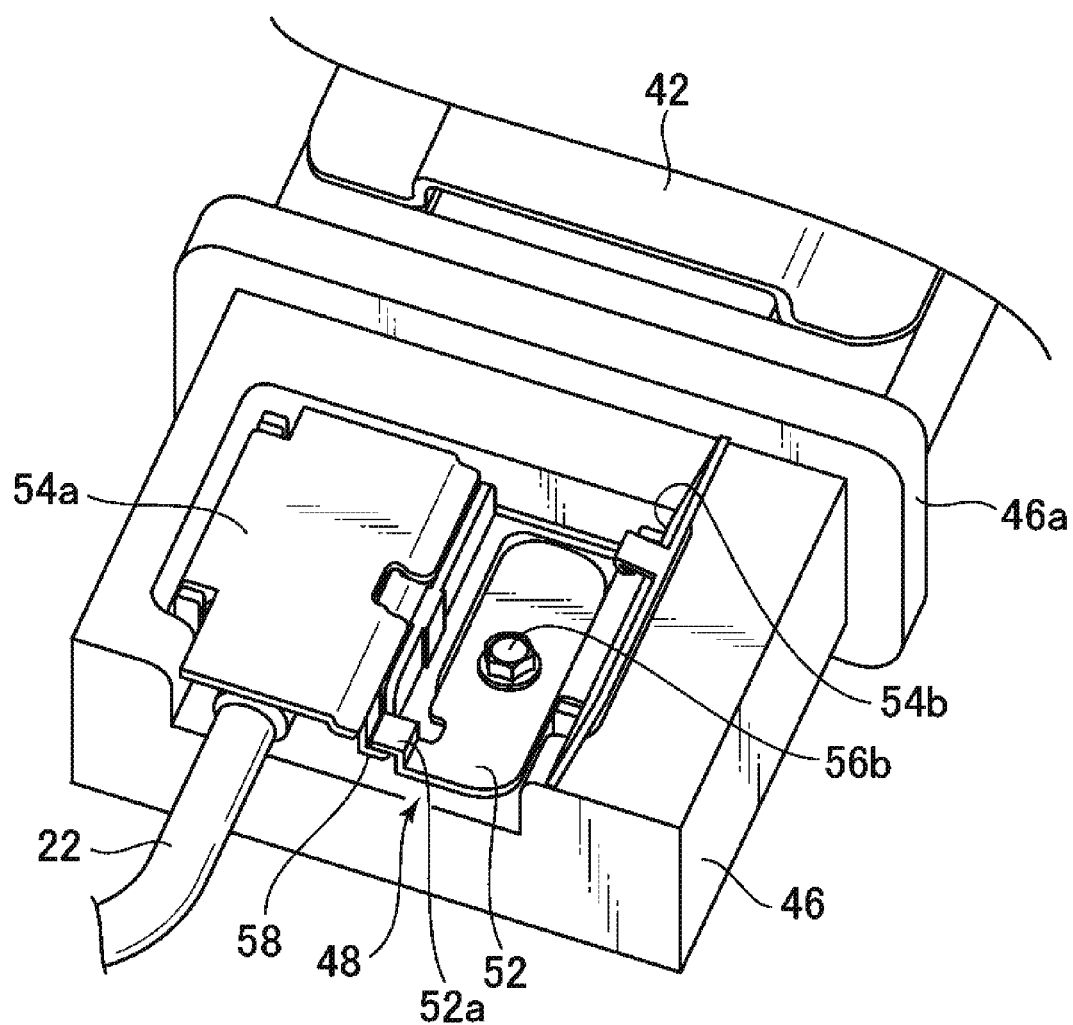
FIG. 6 is a view for illustrating the procedure of connecting the wire harness to the battery according to the embodiment of the present embodiment.

As illustrated in FIG. 6, the ground plate 52 is a substantially rectangular plate-shaped member that is made of conductive metal, and is formed to be fixed to the minus terminal 14b by a screw 56b. When being fixed to the minus terminal 14b, the ground plate 52 contacts both of the minus terminal 14b and the battery case 46. Thus, the minus terminal 14b and the battery case 46 are electrically connected by the ground plate 52. In addition, the ground plate 52 is provided with a tongue section 52a that extends toward the plus terminal 14a. As will be described later, the tongue section 52a is configured to be engaged with the plus terminal cover 54a at a closed position.

The plus terminal cover 54a and the minus terminal cover 54b are rectangular plate-shaped covers disposed such that long sides thereof are adjacent to each other, long sides that are not adjacent to each other are rotatably supported by the terminal board 50, and thus is configured to be able to function like a so-called "double door". That is, the plus terminal cover 54a and the minus terminal cover 54b are configured to be rotatable between an open position illustrated in FIG. 4 and the closed position illustrated in FIG. 7. In a state where the plus terminal cover 54a is at the closed position (FIG. 5 and FIG. 6), the plus terminal cover 54a covers the plus terminal 14a and the connection terminal 22a of the wire harness 22. In this way, and owing to the electrical insulative property of the plus terminal cover 54a material, accidental contact, and a potential short circuit condition, with these components is inhibited. Meanwhile, in a state where the minus terminal cover 54b, which is also made of a material with electrically insulative material, is at the closed position (FIG. 7), the minus terminal cover 54b covers the minus terminal 14b and the ground plate 52. In this way, accidental contact with these components is inhibited.

Furthermore, the minus terminal cover 54b is configured such that the adjacent long side thereof overlaps the adjacent long side of the plus terminal cover 54a. Thus, as illustrated in FIG. 7, in the state where the minus terminal cover 54b is at the closed position, the plus terminal cover 54a abuts the minus terminal cover 54b and thus is prevented from rotating to the open position. That is, in a state of covering the minus terminal 14b, the minus terminal cover 54b restricts the plus terminal cover 54a such that the plus terminal 14a is not exposed. Moreover, a projected section 58 (FIG. 5) is formed on the long side, which is adjacent to the minus terminal cover 54b, in the plus terminal cover 54a. This projected section 58 is formed to be projected from one end of the long side of the plus terminal cover 54a to the minus terminal 14b side. In the state where the plus terminal cover 54a is at the closed position (FIG. 5), when the ground plate 52 is fixed to the minus terminal 14b (FIG. 6), the tongue section 52a of the ground plate 52 abuts an upper portion of the projected section 58 of the plus terminal cover 54a. Just as described, in the state where the ground plate 52 is fixed to the minus terminal 14b, the projected section 58 and the tongue section 52a are engaged with each other. As a result, the plus terminal cover 54a cannot rotate to the open position.

Figure 8:
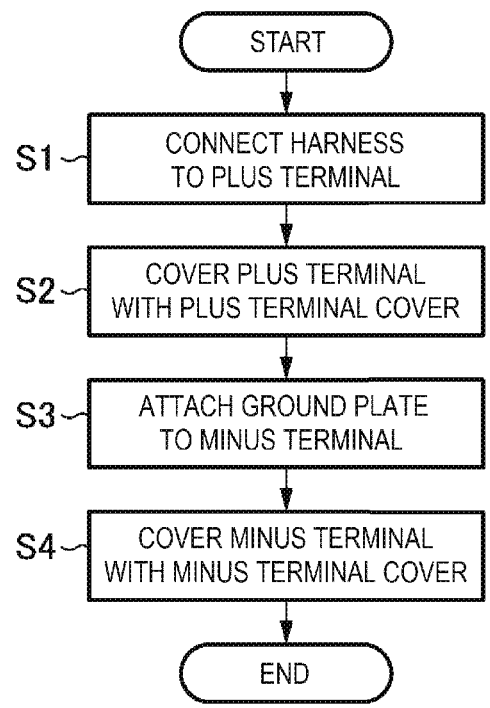
FIG. 8 is a flowchart of each step in a method for connecting a conductive wire to the battery according to the embodiment of the present embodiment.

Next, newly referring to FIG. 8, a description will be made on a method for connecting the conductive wire to the battery according to the embodiment of the present disclosure. FIG. 8 is a flowchart of each step in the method for connecting the conductive wire to the battery according to the embodiment of the present disclosure.

In the state where the wire harness 22 is not attached to the lithium-ion battery 14 as the battery, both of the plus terminal cover 54a and the minus terminal cover 54b are at the open positions, and the ground plate 52 is not attached to the minus terminal 14b. In such a state, the battery case 46 is not electrically connected to the minus terminal 14b. Thus, even in the case where a tool or the like that is made of metal simultaneously contacts the plus terminal 14a and the battery case 46, a short circuit does not occur between the plus terminal 14a and the minus terminal 14b.

First, in step S1 illustrated in FIG. 8, as illustrated in FIG. 4, the connection terminal 22a of the wire harness 22 is fixed to the plus terminal 14a of the lithium-ion battery 14 by the screw 56a. In this way, the wire harness 22 is connected to the plus terminal 14a. As a result, the plus terminal 14a of the lithium-ion battery 14 and an electrical conductor of the wire harness 22 are electrically connected. The ground plate 52 is not attached to the minus terminal 14b in the state illustrated in FIG. 4. Thus, even in the case where the connection terminal 22a accidentally and simultaneously contacts the plus terminal 14a and the battery case 46 at the time of connecting the wire harness 22, the short circuit does not occur between the plus terminal 14a and the minus terminal 14b.

Figure 5:
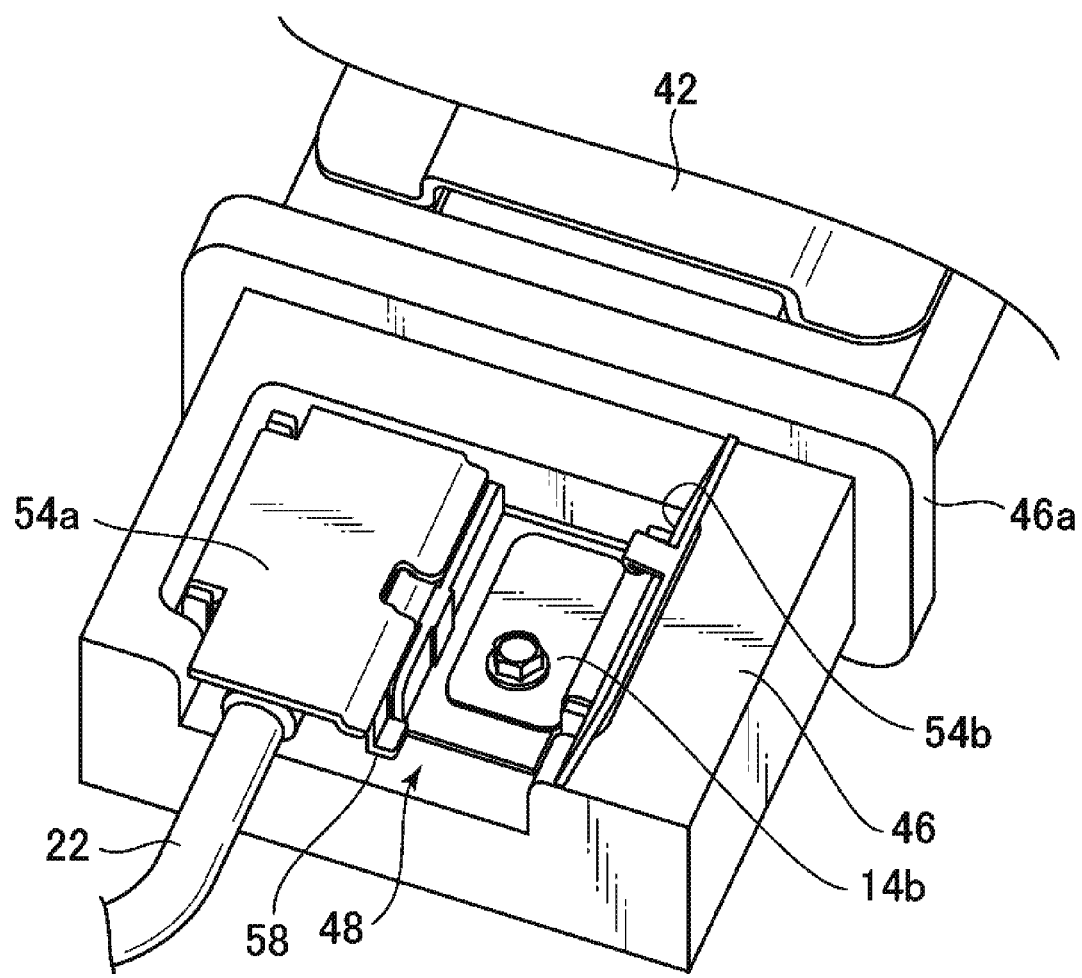
FIG. 5 is a view for illustrating the procedure of connecting the wire harness to the battery according to the embodiment of the present embodiment.

Next, in step S2, as illustrated in FIG. 5, the plus terminal cover 54a rotates to the closed position, and the plus terminal 14a, to which the wire harness 22 is connected, is covered with the plus terminal cover 54a. Just as described, in the state where the plus terminal 14a is covered with the plus terminal cover 54a, metallic portions of the plus terminal 14a and the connection terminal 22a are not exposed, and thus the accidental contact therewith is prevented.

In step S3, as illustrated in FIG. 6, the ground plate 52 is fixed to the minus terminal 14b by the screw 56b. Just as described, in the state where the ground plate 52 is fixed to the minus terminal 14b, the projected section 58 of the plus terminal cover 54a is pressed by the tongue section 52a of the ground plate 52, and the plus terminal cover 54a is thereby fixed at the closed position. In this way, the exposure of the plus terminal 14a in the state where the minus terminal 14b is electrically connected to the battery case 46 is restricted.

In addition, when the ground plate 52 is fixed to the minus terminal 14b, the minus terminal 14b is electrically connected to the battery case 46. In this way, the minus terminal 14b is connected to the vehicle body of the vehicle 1 via the battery case 46. That is, the battery case 46 is fixed to the tunnel side frame 30b and the floor frame 32b of the vehicle body by the first fixing bracket 42 and the second fixing bracket 44. Accordingly, the battery case 46 is electrically connected to the vehicle body (the tunnel side frame 30b, the floor frame 32b, and the like) via these first and second fixing brackets 42, 44 as well as the bolts and the like for fixing the first and second fixing brackets 42, 44.

Furthermore, when the ground plate 52 is fixed to the minus terminal 14b, the minus terminal 14b is electrically connected to the battery case 46. In such a state, the plus terminal cover 54a is fixed at the closed position. Thus, even in the case where the minus terminal 14b and the battery case 46 are connected to each other, the accidental short circuit between the plus terminal 14a and the battery case 46 is prevented.

Next, in step S4, as illustrated in FIG. 7, the minus terminal cover 54b rotates to the closed position, and the minus terminal 14b and the ground plate 52 are covered with the minus terminal cover 54. In this way, connection work of the wire harness 22 to the lithium-ion battery 14 is completed.

Figure 9:
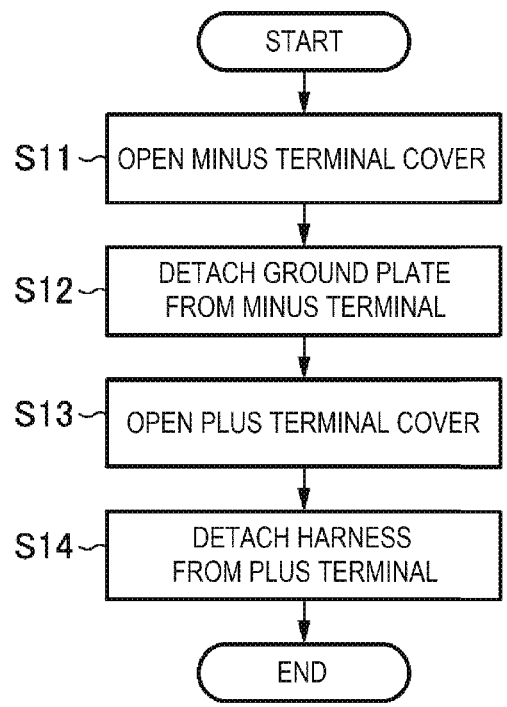
FIG. 9 is a flowchart of each step in a method for disconnecting the conductive wire from the battery according to the embodiment of the present embodiment.

Next, newly referring to FIG. 9, a description will be made on a method for disconnecting the conductive wire from the battery according to the embodiment of the present disclosure. FIG. 9 is a flowchart of each step in the method for disconnecting the conductive wire from the battery according to the embodiment of the present disclosure.

As described above, in the state where the wire harness 22 is attached to the lithium-ion battery 14, the plus terminal cover 54a and the minus terminal cover 54b are at the closed positions, and the plus terminal 14a and the minus terminal 14b that are covered therewith are not exposed (FIG. 7). Thus, even in the case where the minus terminal 14b is connected to the battery case 46 by the ground plate 52, the short circuit does not occur between the battery case 46 (the minus terminal 14b) and the plus terminal 14a.

First, in step S11 illustrated in FIG. 9, as illustrated in FIG. 6, the minus terminal cover 54b rotates to the open position, and the ground plate 52 is exposed. Since the plus terminal cover 54a is pressed by the ground plate 52 in such a state, the plus terminal cover 54a cannot rotate to the open position.

Next, in step S12, the screw 56b is untightened. Then, as illustrated in FIG. 5, the ground plate 52 is detached. In such a state, the plus terminal cover 54a can rotate to the open position, and the plus terminal 14a can be exposed. Meanwhile, since the ground plate 52 is detached, the connection between the minus terminal 14b and the battery case 46 can also be canceled.

Furthermore, in step S13, as illustrated in FIG. 4, the plus terminal cover 54a is operated to be opened and moved to the open position. In this way, the plus terminal 14a is exposed. Here, the connection between the minus terminal 14b and the battery case 46 is canceled. Thus, even in the case where the tool or the like that is made of the metal simultaneously contacts the plus terminal 14a and the battery case 46, the short circuit does not occur between the plus terminal 14a and the minus terminal 14b.

Lastly, in step S14, the screw 56a is untightened, and the connection terminal 22a is detached from the plus terminal 14a. In this way, disconnection work of the wire harness 22 is completed. Just as described, according to the battery of this embodiment, it is possible to prevent the occurrence of the short circuit between the plus terminal 14a and the minus terminal 14b while the minus terminal 14b is connected to the vehicle body of the vehicle 1 via the battery case 46, which is formed of the electric conductor.

According to the lithium-ion battery 14 as the battery in the embodiment of the present disclosure, the minus terminal 14b and the battery case 46 are electrically connected to each other by the ground plate 52 (FIG. 6), and the minus terminal 14b is electrically connected to the vehicle body of the vehicle 1 via the battery case 46. Thus, the minus terminal 14b can be connected to the vehicle body without using a special harness. In this way, it is possible to reduce cost of the harness and to prevent a case where the connection of the harness to the vehicle body is forgotten and the accidental disconnection thereof. In addition, in the state where the minus terminal 14b is connected to the battery case 46, the tongue section 52a of the ground plate 52 abuts the projected section 58 of the plus terminal cover 54a. In this way, the exposure of the plus terminal 14a is restricted by the plus terminal cover 54a. Thus, it is possible to prevent the short circuit between the plus terminal 14a and the minus terminal 14b via the battery case 46.

According to the battery of this embodiment, in the state where the minus terminal cover 54b covers the minus terminal 14b, the plus terminal cover 54a is restricted to prevent the exposure of the plus terminal 14a (FIG. 7). Thus, it is possible to further reliably prevent the exposure of the plus terminal 14a in the state where the minus terminal 14b is connected to the battery case 46.

According to the battery of this embodiment, the battery case 46 is connected to the vehicle body via the conductive first fixing bracket 42 and the conductive second fixing bracket 44, which are used to fix the battery case 46 to the vehicle body (FIG. 2). Thus, the battery case 46 can be connected to the vehicle body without providing a special member that electrically connects the battery case 46 and the vehicle body. In addition, it is possible to reliably prevent a case where the connection of the battery case 46 to the vehicle body is forgotten.

According to the battery of this embodiment, as the battery brackets, two of the first fixing bracket 42 and the second fixing bracket 44 are aligned in the longitudinal direction (FIG. 3). Thus, even in the case of contact failure between any of the brackets and the battery case 46 or between any of the brackets and the vehicle body, the battery case 46 can reliably and electrically be connected to the vehicle body.

According to the method for connecting the wire harness 22 to the plus terminal 14a of the battery in this embodiment (FIG. 8), the ground plate 52 is attached to the minus terminal 14b of the lithium-ion battery 14. In this way, the exposure of the plus terminal 14a is restricted. Accordingly, in the work of connecting the wire harness 22 to the plus terminal 14a, it is possible to prevent the minus terminal 14b and the battery case 46 from being connected to each other by the ground plate 52 while the plus terminal 14a is exposed. In this way, in the work of connecting the wire harness 22 to the plus terminal 14a of the lithium-ion battery 14, it is possible to prevent the short circuit between the plus terminal 14a and the minus terminal 14b.

According to the method for disconnecting the wire harness 22 from the plus terminal 14a of the battery in this embodiment (FIG. 9), the ground plate 52 is detached from the minus terminal 14b of the lithium-ion battery 14. In this way, the plus terminal 14a can be exposed. Thus, it is possible to prevent the exposure of the plus terminal 14a while the minus terminal 14b and the battery case 46 remain to be connected to each other. As a result, in the work of disconnecting the wire harness 22 from the plus terminal 14a of the lithium-ion battery 14, it is possible to prevent the short circuit between the plus terminal 14a and the minus terminal 14b.

The description has been made so far on the embodiment of the present disclosure. However, various modifications can be made to the above-described embodiment. In particular, in the above-described embodiment, the present disclosure is applied to the lithium-ion battery as the battery. However, the present embodiment can also be applied to any battery such as a nickel metal hydride battery.

In addition, in the above-described embodiment, the plus terminal cover 54a and the minus terminal cover 54b are configured as the "double door". However, the plus terminal cover and/or the minus terminal cover can adopt any mode. For example, the present embodiment can also be configured that the plus terminal cover is configured to be attachable/detachable to/from the battery case, and the ground plate (the ground member) is attached to the minus terminal, so as to disallow the detachment of the plus terminal cover. Alternatively, the present embodiment can also be configured that the plus terminal cover is configured to be slidable with respect to the battery case, and the ground plate (the ground member) is attached to the minus terminal, so as to disallow sliding of the plus terminal cover from the closed position. Meanwhile, the minus terminal cover may adopt a different mode from the plus terminal cover or may not be provided.

Furthermore, in the above-described embodiment, the plate-shaped ground plate is used as the ground member. However, the ground member may not be a plate-shaped member and can adopt any mode. Moreover, in the above-described embodiment, the wire harness is used as the conductive wire. However, any electrical conductor can be used as the conductive wire.

DESCRIPTION OF REFERENCE SIGNS AND NUMERALS

1: Vehicle
2: Transmission
3: Decelerator
4: Driveshaft
5: Wheel
6: Relay circuit
6a: Resistor
6b, 6c: Switching element
8: Belt
9: Output shaft
11: Engine
12: Gear-driven starter
13: ISG
14: Lithium-ion battery (battery)
14a: Plus terminal
14b: Minus terminal
17: DC/DC converter
19: Lead storage battery
20: High-voltage electric load
21: Low-voltage electric load
22: Wire harness (conductive wire)
22a: Connection terminal
24: Floor panel
26: Exhaust pipe
28: Tunnel section
30a, 30b: Tunnel side frame
32a, 32b: Floor frame
34a, 34b: Side sill
36a: First tunnel cross member
36b: Second tunnel cross member
38: Recessed section
40a: First recessed section cross member
40b: Second recessed section cross member
42: First fixing bracket (battery bracket)
44: Second fixing bracket (battery bracket)
46: Battery case
46a: First seal member
46b: Second seal member
48: Wire connection section
50: Terminal board
52: Ground plate (ground member)
52a: Tongue section
54a: Plus terminal cover
54b: Minus terminal cover
56a: Screw
56b: Screw
58: Projected section

The invention claimed is:

1. A battery mounted on a vehicle, the battery comprising:
a battery case including an electrically conductive material and configured to be attached to a body of the vehicle so as to electrically connect to the body of the vehicle, the battery case including
a plus terminal to which a wire harness is connected to supply electric power to electrical equipment onboard the vehicle, wherein the wire harness is connected to the plus terminal from outside of the battery,
a minus terminal,
a ground member that is attached to the minus terminal so as to electrically connect the minus terminal and the battery case, and
a plus terminal cover that only covers the plus terminal, wherein
in a state where the ground member is attached to the minus terminal, the ground member abuts the plus terminal cover from outside of the plus terminal cover so as to restrict a movement of the plus terminal cover from exposing the plus terminal.

2. The battery according to claim 1 further comprising:
a minus terminal cover that only covers the minus terminal when the minus terminal cover is in a closed state, wherein
in the closed state, the minus terminal cover abuts the plus terminal cover so as to restrict exposure of the plus terminal by a movement of the plus terminal cover, wherein the minus terminal cover abuts the plus terminal cover from outside of the plus terminal cover.

3. The battery according to claim 1, wherein
the battery case is electrically connected to the vehicle body of the vehicle via a conductive battery bracket used to fix the battery case to the vehicle body of the vehicle.

4. The battery according to claim 3, wherein
the conductive battery bracket and at least one other battery bracket are aligned in a longitudinal direction of the vehicle.

5. The battery according to claim 1, wherein
the plus terminal cover includes a projection section that extends into a space that is covered by the minus terminal cover when in a closed state.

6. The battery according to claim 5, wherein the ground member is detachably attached to the battery case.

7. The battery according to claim 6, wherein the ground member includes a tongue section that covers the projected section of the plus terminal cover so attachment of the ground member to the battery case causes the tongue section to resist an upward movement of the projected section of the plus terminal cover and avoid inadvertent exposure of the plus terminal.

8. A method for connecting a wire harness to a plus terminal of a battery, the method comprising:
   connecting the wire harness to the plus terminal, the battery including a battery case having an electrically conductive material attached a body of a vehicle so as to electrically connect the battery case to the body of the vehicle, wherein the wire harness is connected to the plus terminal from outside of the battery:
   covering the plus terminal, to which the wire harness is connected, with a plus terminal cover that only covers the plus terminal, the wire harness providing electric power from the battery to the electrical equipment on-board the vehicle; and
   attaching a ground member to a minus terminal of the battery, electrically connecting the minus terminal and a battery case of the battery, and restricting exposure of the plus terminal by abutting the ground member to the plus terminal cover so as to restrict a movement of the plus terminal cover from exposing the plus terminal cover, wherein the ground member abuts the plus cover terminal from outside of the plus terminal cover.

9. The method of claim 8, further comprising:
   covering the minus terminal in a closed state, wherein
   the minus terminal cover only covers the minus terminal, and
   in the closed state, the minus terminal cover abuts the plus terminal cover so as to restrict exposure of the plus terminal by a movement of the plus terminal cover, wherein the minus terminal cover abuts the plus terminal cover from outside of the plus terminal cover.

10. The method according to claim 8, wherein
the battery case is electrically connected to the vehicle body of the vehicle via a conductive battery bracket used to fix the battery case to the vehicle body of the vehicle.

11. The method according to claim 10, wherein
the conductive battery bracket and at least one other battery bracket are aligned in a longitudinal direction of the vehicle.

12. The method according to claim 8, wherein
the plus terminal cover includes a projection section that extends into a space that is covered by the minus terminal cover when in a closed state.

13. The method according to claim 12, wherein the ground member is detachably attached to the battery case.

14. The method according to claim 13, wherein the ground member includes a tongue section that covers the projected section of the plus terminal cover so attachment of the ground member to the battery case causes the tongue section to resist an upward movement of the projected section of the plus terminal cover and avoid inadvertent exposure of the plus terminal.

15. A method for disconnecting a wire harness from a plus terminal of a battery, the method comprising:
   detaching a ground member from a minus terminal of the battery, so as to electrically disconnect a battery case of the battery and the minus terminal, and to allow exposure of the plus terminal, the battery case having an electrically conductive material attached a body of a vehicle so as to electrically connect the battery case to the body of the vehicle, the wire harness providing electric power from the battery to the electrical equipment on-board the vehicle, wherein the wire harness is connected to the plus terminal from outside of the battery;
   releasing a movement of a plus terminal cover of the battery to expose the plus terminal, the releasing including moving the ground member from being in abutment with the plus terminal cover so as to permit movement of the plus terminal cover and exposure of the plus terminal, wherein the plus terminal cover only covers the plus terminal and the ground member abuts the plus cover terminal from outside of the plus terminal cover; and
   disconnecting the wire harness from the plus terminal once the plus terminal is exposed.

* * * * *